UNITED STATES PATENT OFFICE 3,663,560
Patented May 16, 1972

3,663,560
PYRAZOLYL-TRIAZOLYL COUMARINS
Carl-Wolfgang Schellhammer, Opladen, Alfons Dorlars, Leverkusen, and Wolf-Dieter Wirth, Cologne-Stammheim, Germany, assignors to Farbenfabriken Bayer Aktiengesellschaft, Leverkusen, Germany
No Drawing. Filed May 13, 1968, Ser. No. 728,800
Claims priority, application Germany, May 22, 1967,
F 52,479
Int. Cl. C07d 99/04; C09k 1/02
U.S. Cl. 260—299          2 Claims

ABSTRACT OF THE DISCLOSURE

7 - [pyrazolyl - (1)]-3-[1,2,4-triazolyl-(1)-]-coumarins and their quaternization products, adapted for use as brightening agents, are prepared by condensing 7-hydrazino-3-[1,2,4-triazolyl(1)]-coumarins with 1,3 - dicarbonyl compounds and optionally quaternizing that product.

The object of the present invention comprises new, fluorescent, practically colourless 7 - [pyrazolyl - (1)]-3-[1,2,4-triazolyl-(1)]-coumarin derivatives of the general formula

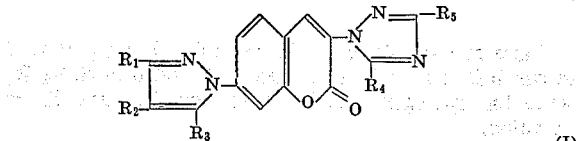

in which $R_1$ to $R_5$ independently of one another, denote hydrogen, optionally substituted alkyl radials containing 1-4 carbon atoms, aralkyl radicals, optionally substituted aryl radicals, or halogen atoms, or their quaternisation products of the formula

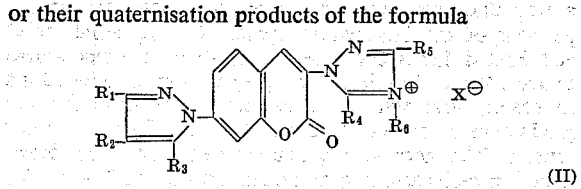

in which $R_1$–$R_5$ have the same meaning as above, $R_6$ stands for an optionally substituted alkyl or aralkyl radical, and $X(-)$ represents an anion.

Examples of optionally substituted alkyl radicals include the following: $CH_3$, $C_2H_5$, $C_3H_7$, $C_4H_9$, $CH_2Cl$, $CH_2OCH_3$.

Optionally substituted aralkyl radicals include, for example, radicals such as

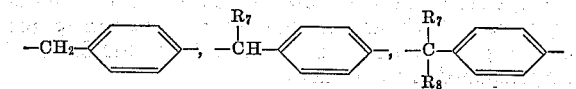

in which $R_7$ and $R_8$ stand for a lower alkyl group, and the aromatic nucleus may contain further substituents.

Suitable aralkyl radicals are the following, for example:

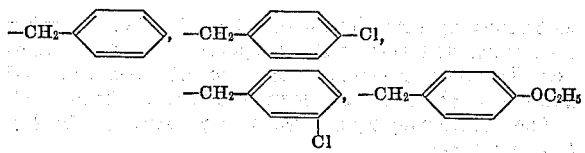

The term optionally substituted aryl radicals preferably comprises phenyl radicals which may contain substituents, such as halogen, particularly chlorine and bromine, cyano, alkyl, alkoxy, carboxyl, acylamino, sulphonic acid, sulphonamide, carbonamide or alkyl-sulphone groups.

Suitable radicals of this type are, for example, chlorophenyl, dichlorophenyl, methoxyphenyl, ethoxyphenyl, carbonmethoxyphenyl, carboethoxyphenyl, carbonamidophenyl and carboxyphenyl.

Halogen atoms are, in particular, chlorine and bromine.

The anion X is preferably a colourless anion which is either derived from the quaternising agent used, or has been introduced by subsequent exchange of the anion present from the production for any other anion, preferably a colourless anion.

As anions there may be used, for example $Cl^{(-)}$, $Br^{(-)}$, sulphonate groups, such as $OSO_3CH_3{}^{(-)}$,

$$OSO_3C_2H_5{}^{(-)}$$

paratoluene-sulphonate, benzene sulphonate, phosphate, acetate, chlorozincate, perchlorate, nitrate, sulphate and oxalate radicals.

The compounds of the Formula I can be prepared in the following manner: 1,2,4-triazolyl-(1)-acetic acids of the general formula

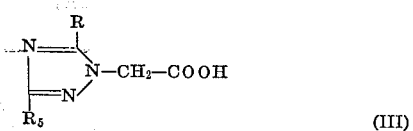

(III)

in which $R_4$ and $R_5$ have the same meaning as above, are reacted with 4-acetylamino-salicyliden-aniline in the presence of sodium acetate an dacetic anhydride at 140–180° C. to give 7-acetylamino-3-[1,2,4-triazolyl-(1)]-coumarins of the general formula

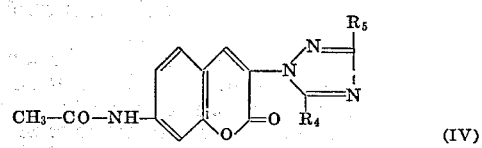

(IV)

in which $R_4$ and $R_5$ have the same meaning as above. The acyl radical was split off by a dilute mineral acid, such as hydrochloric acid, or by dilute sulphuric acid, the resultant 7-amino-3[1,2,4-triazolyl-(1)]-courarin of the general formula

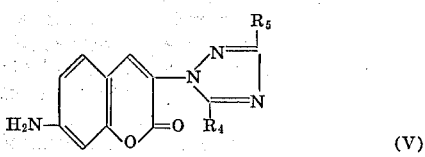

(V)

in which $R_4$ and $R_5$ have the same meaning as above, is diazotised in a mineral acid solution, the diazonium salt reduced, e.g. with tin(II)-chloride in a hydrochloric acid solution, to give the 7-hydrazino compound of the general formula

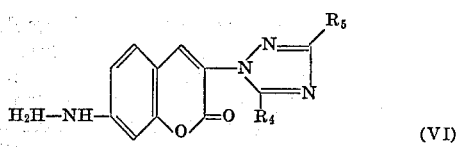

(VI)

in which $R_4$ and $R_5$ have the same meaning as above. These hydrazines yield 7-[pyrazolyl-(1)]-3-[1,2,4-triazolyl-(1)]-coumarins of the general Formula I in the reaction with 1,3-dicarbonyl compounds of the general formula

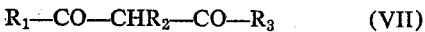

$$R_1\text{—CO—CHR}_2\text{—CO—R}_3 \qquad (VII)$$

in which $R_1$ to $R_3$ have the same meaning as above, or with functional derivatives of the 1,3-dicarbonyl compounds, such as, for example, acetals or ketals of these compounds, in an organic, aqueous organic or in a mineral acidic aqueous solution at temperatures of about 80–130° C., and, if acetals or ketals are used, it is necessary to acidify the medium with a mineral acid in order to split off the protective group.

The compounds of the general Formula II are obtained by the reaction of compounds of the Formula I with quaternising agents in known manner, for example in an inert organic solution. Suitable alkylating agents are, for example, the esters of strong mineral acids and organic sulphonic acids with, preferably, low molecular weight alcohols, such as alkyl chlorides, alkyl bromides, aralkyl halides, dialkyl sulphates and esters of sulphonic acids of the benzene series, such as methyl, ethyl, propyl n-butyl esters of benzene sulphonic acid, of the p-methylbenzene sulphonic acid, p-chlorobenzene sulphonic acid and p-nitrobenzene sulphonic acid.

As inert organic solvents there may be used, for example, higher boiling aliphatic, cycloaliphatic or oramotic hydrocarbons, furthermore stable aliphatic or cyclic halogen compounds, such as carbon tetrachloride, tetrachloroethylene, mono- or dichlorobenzene, and nitrobenzene. When avoiding too violent reaction conditions, it is also possible to operate in an excess of liquid quaternising agent.

1,2,4-triazolyl-(1)-acetic acid is known. Triazolyl-(1)-acetic acids with substituents $R_4$ and $R_5$ can be obtained by reacting correspondingly substituted 1,2,4-triazoles with halo-ethyl acetates, e.g. bromo-ethyl acetate or chloro-ethyl acetate, and subsequent hydrolysis of the 3,5-disubstittued 1,2,4-triazolyl-(1)-ethyl acetate.

1,3-dicarbonyl compounds which are suitable for the reaction with 7-hydrazino-3-[1,2,4-triazolyl-(1)]-coumarins are, for example, malon-(di)aldehyde or malon-(di)aldehydetetraalkyl acetal, 3-keto-butyraldehyde or 3-keto-butyraldehydedimethylacetal, benzoylacetaldehyde or benzoylacetaldehydedimethylacetal, dibenzoylmethane, 2-chloro-malon-(di)aldehyde, acetylacetone or benzoylacetone.

The fluorescent compounds of the Formula I or II are suitable for brightening materials of a great variety, primarily for brightening fibres, filaments, woven and knitted fabrics, foils or plastic compounds of synthetic origin, e.g. for brightening materials of cellulose esters, polyamides, polyurethanes, polyacrylonitrile and polyesters. The compounds of the Formula II are particularly suited for brightening materials of polyacrylonitrile.

Compounds of the general Formula I suitable to be used as brightening agents are set out, by way of example, in the following Table A; the compounds listed in Table B as brightening agents of the general Formula II.

TABLE A.—COMPOUNDS OF THE FORMULA (I)

| $R_1$ | $R_2$ | $R_3$ | $R_4$ | $R_5$ |
|---|---|---|---|---|
| H | H | H | H | H |
| $CH_3$ | H | H | H | H |
| H | H | $CH_3$ | H | H |
| $CH_3$ | H | $CH_3$ | H | H |
| H | Cl | H | H | H |
| $C_6H_5$ | H | H | H | H |
| H | H | $C_6H_5$ | H | H |
| $C_6H_5$ | H | H | $CH_3$ | $CH_3$ |
| $CH_3$ | H | H | $CH_3$ | $CH_3$ |
| $CH_3$ | H | $CH_3$ | $CH_3$ | $CH_3$ |

TABLE B.—COMPOUNDS OF THE FORMULA (II)

| $R_1$ | $R_2$ | $R_3$ | $R_4$ | $R_5$ | $R_6$ | $X^-$ |
|---|---|---|---|---|---|---|
| H | H | H | H | H | $CH_3$ | $CH_3SO_4^\ominus$ |
| $CH_3$ | H | H | H | H | $CH_3$ | $CH_3SO_4^\ominus$ |
| $CH_3$ | H | H | H | H | $C_2H_5$ | $C_2H_5SO_4^\ominus$ |
| H | H | H | H | H | $C_2H_5$ | $C_2H_5SO_4^\ominus$ |
| H | Cl | H | H | H | $CH_3$ | $CH_3SO_4^\ominus$ |
| H | Cl | H | H | H | $C_2H_5$ | $CH_3SO_4^\ominus$ |
| $CH_3$ | H | $CH_3$ | H | H | $CH_3$ | $CH_3SO_4^\ominus$ |
| $CH_3$ | H | H | H | H | $CH_3$ | $CH_3\text{–}\langle\!\!\bigcirc\!\!\rangle\text{–}SO_3^\ominus$ |
| $CH_3$ | H | $CH_3$ | $CH_3$ | $CH_3$ | $CH_3$ | $CH_3\text{–}\langle\!\!\bigcirc\!\!\rangle\text{–}SO_3^\ominus$ |
| H | H | $CH_3$ | H | H | $CH_3$ | $CH_3SO_4^\ominus$ |
| $CH_3$ | H | H | H | H | $(n)C_4H_9$ | $Br^\ominus$ |
| $CH_3$ | H | H | H | H | $CH_2\text{–}\langle\!\!\bigcirc\!\!\rangle$ | $Cl^\ominus$ |

Those compounds of the Formula I or II are preferred in which $R_1$ stands for hydrogen, $CH_3$ and phenyl, $R_2$–$R_5$ stand for hydrogen, and $R_6$ stands for $CH_3$, and $X^-$ is an anion.

The brightening agents according to the present invention can be used in conventional manner, for example, in the form of solutions in water or in organic solvents, or in the form of aqueous dispersions. Polyester materials can be treated with the brightening agents in such a way that they are impregnated with solutions or dispersions of the brightening agents, then squeezed, dried and heated for a short period of time at temperatures above 150° C. The brightening agents can also be added to casting and spinning solutions which serve for the production of synthetic fibres, filaments, foils and other articles. The necessary quantities can readily be determined in each case; in general, amounts of 0.1% to 0.5%, referred to the material to be brightened, have proved to be sufficient.

The brightening agents according to the invention have an extraordinary high yield. They are stable towards chlorite-containing bleaching baths and the brightening effects attained are very fast to light.

EXAMPLE 1

Polyacrylonitrile fibres are introduced, in a goods-to-liquor ratio 1:40, into an aqueous bath containing, per litre, 1 g. oxalic acid, 1 g. sodium chlorite and 0.1 g. of the compound of the formula

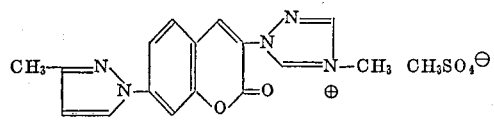

as brightening agent. The bath is heated to boiling wtihin 20 minutes and kept at this temperature for 45–60 minutes. The polyacrylonitrile fibres are subsequently rinsed and dried. The fibres are then outstandingly brightened.

The brightening agent used was prepared in the following manner:

A mixture of 254 g. 4-acetylamino-salicylidene-aniline, 153 g., 1,2,4-triazolyl-(1)-acetic acid, 99 g. anhydrous sodium acetate and 510 g. acetic anhydride is heated at an internal temperature of 145° C. for 12 hours while stirring. The mixture is then cooled to 100° C., followed by the addition of 500 cc. concentrated hydrochloric acid in the course of 30 minutes, and the mixture is boiled under reflux for a further 4 hours. The content of the flask is subsequently poured on to 5 litres of ice-water and a pH of 1.5 is adjusted with a concentrated sodium hydroxide solution. The 7-amino-3-[1,2,4-triazolyl-(1)]-coumarin is filtered off with suction, the filter cake suspended in 3 litres of water, and the mixture is rendered ammoniacal. It is again filtered off with suction, washed with water and dried at 120° C. There are obtained 148 g. 7-amino-3-[1,2,4-triazolyl-(1)]-coumarin of melting point 265–268° C.

148 g. 7-amino-3-[1,2,4-triazolyl-(1)]-coumarin are dissolved hot in a mixture of 750 cc. concentrated hydrochloric acid and 750 cc. of water. The solution is cooled to 0° C. and diazotised with a solution of 45 g. sodium nitrite in 150 cc. of water. Stirring is continued for a further hour and the clear diazonium salt solution is then run at 0° C. into a mixture of 294 g. tin(II)-chloride and 600 cc. concentrated hydrochloric acid. The reaction mixture is further stirred for one hour and then poured into 3 litres of water. The 7-hydrazino-3-[1,2,4-triazolyl-(1)]-coumarin hydrochloride is filtered off with suction, suspended in 3 litres of warm water and the mixture is rendered ammoniacal. It is again filtered off with suction, washed with water and dried. There are obtained 127 g. 7-hydrazino-3-[1,2,4-triazolyl-(1)]-coumarin of melting point 249° C. (decomposition).

127 g. 7-hydrazino - 3 - [1,2,4-triazolyl-(1)]-coumarin, 82 g. 3-keto-butyraldehyde-dimethylacetal and 400 cc. glacial acetic acid are heated to boiling. A dark solution is formed which is cooled to 60° C. and mixed with 50 cc. concentrated hydrochloric acid. The mixture is subsequently boiled under reflux for a further 2 hours, then mixed with 50 g. sodium acetate and filtered off with suction. The filter cake is washed with water and methanol. There are thus obtained 150 g. 7-[3-methyl-pyrazolyl-(1)] - 3 - [1,2,4-triazolyl-(1)]-coumarin of melting point 246° C. in the form of small, pale yellow crystals. The compound can be purified by redissolution, e.g. from DMF or glycol-monomethyl ether acetate.

150 g. 7-[3-methyl-pyrazolyl-(1)] - 3 - [1,2,4-triazolyl-(1)]-coumarin are dissolved in 10 litres boiling chlorobenzene. 130 g. dimethyl sulphate are added dropwise to the solution which is heated for a further hour. The precipitated quaternised product is then filtered off with suction while hot. The filter cake is washed with methanol. There are obtained 180 g. 7-[3-methyl-pyrazolyl-(1)]-3-[1,2,4-triazolyl-(1)]-coumarin-methosulphate of melting point 236–238° C. (decomposition) in the form of small, pale yellow crystals. The compound is very readily water-soluble.

Good brightening effects on polyacrylonitrile fibres are also obtained when, instead of the above-mentioned compound, one of the compounds set out in the following Table are used:

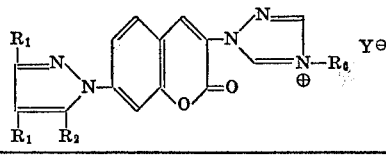

| Brightening agent | $R_1$ | $R_2$ | $R_3$ | $R_4$ | Y | Melting point, °C. |
|---|---|---|---|---|---|---|
| (a) | H | H | H | $CH_3$ | $CH_3SO_4-$ | 224–226 |
| (b) | H | H | H | $C_2H_5$ | $C_2H_5SO_4-$ | 214 |
| (c) | $CH_3$ | H | H | $CH_3$ | $p\text{-}CH_3C_6H_4SO_3-$ | 264 |
| (d) | $CH_3$ | H | H | $C_2H_5$ | $C_2H_5SO_4-$ | 196 |
| (e) | $CH_3$ | H | $CH_3$ | $CH_3$ | $CH_3SO_4-$ | |
| (f) | $C_6H_5$ | H | H | $CH_3$ | $CH_3SO_4-$ | |
| (g) | H | H | $CH_3$ | $CH_3$ | $CH_3SO_4-$ | |
| (h) | H | Cl | H | $CH_3$ | $CH_3SO_4-$ | |

The brightening agents listed under (a) and (b) are obtained from 7 - hydrazino - 3 - [1,2,4-triazolyl-(1)]-coumarin and malon-(di)aldehyde-tetraalkyl acetate and subsequent quaternisation of the resultant 7-[pyrazolyl-(1)] - 3 - [1,2,4-triazolyl-(1)]-coumarin with dimethyl sulphate or diethyl sulphate. The brightening agent (c) is obtained by quaternisation of the above-described 7-[3 - methylpyrazolyl - (1)] - 3 - [1,2,4-triazolyl-(1)]-coumarin with p-toluene-sulphonic acid methyl ester; the brightening agent (d) by quaternisation of the same compound with diethyl sulphate. The brightening agent (e) can be synthesised by condensing 7 - hydrazino - 3 - [1,2,4-triazolyl - (1)]-coumarin with acetyl-acetone and subsequent quaternisation of 7 - [3,5 - dimethyl-pyrazolyl-(1)]-3 - [1,2,4 - triazolyl - (1)]-coumarin with dimethyl sulphate. Brightening agent (f) is prepared by condensation of 1 - benzoyl - 2 - methoxy-ethylene with 7 - [β-acetylhydrazino - 3 - triazolyl - (1)] - coumarin, subsequent acidic cyclisation and quaternisation with dimethyl sulphate. Brightening agent (g) is obtained by the condensation of 7 - hydrazino - 3 - [1,2,4 - triazolyl-(1)]-coumarin with aceto-acetaldehyde in hydrochloric acid and subsequent quaternisation. Finally, the brightening agent (h) is obtained by the condensation of 7-hydrazino-3 - [ - 1,2,4 - triazolyl - (1)]-coumarin with 2-chloro-malon-(di)aldehyde to give 7 - [4 - chloro-pyrazolyl-(1)]-3 - [1,2,4 - triazolyl - (1)]-coumarin and subsequent quaternisation of this compound with dimethyl sulphate.

EXAMPLE 2

One of the brightening agents mentioned in Example 1 is added to a conventional polyacrylonitrile spinning solution in such an amount that the concentration of brightening agent in the spun polyacrylonitrile fibre portion is 0.1% by weight. The spinning solution is spun in usual manner and the resultant fibre material moved about for a further 45 minutes, in a goods-to-liquor ratio 1:40, in an aqueous bath of 95° C. containing, per litre, 1 g. sodium chlorite and 1 g. oxalic acid. The fibres obtained then are pure white.

EXAMPLE 3

Fibres of polyethylene glycol terephthalate are introduced, at a goods-to-liquor ratio 1:40, into a bath which contains, per litre, 1 g. oleyl sulphonate, 0.75 g. formic acid and 0.07 g. of one of the brightening agents set out in the table below. The bath is subsequently heated to boiling and kept at this temperature for 30–60 minutes. After rinsing and drying, the polyester fibres exhibit a very good brightening effect.

TABLE

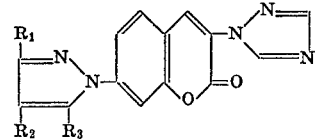

| Brightening agent | $R_1$ | $R_2$ | $R_3$ | Melting point, ° C. |
|---|---|---|---|---|
| (a) | H | H | H | 273–275 |
| (b) | $CH_3$ | H | H | 246 |
| (c) | $C_6H_5$ | H | H | 252 |
| (d) | H | H | $CH_3$ | 169 |
| (e) | $CH_3$ | H | $CH_3$ | 189 |
| (f) | H | Cl | H | |
| (g) | H | H | $C_6H_5$ | 213–214 |

These brightening agents are produced as described in Example 1, the last step, i.e. the quaternisation, being omitted.

EXAMPLE 4

A fabric of cellulose triacetate fibres is introduced, at a goods-to-liquor ratio 1:40, into a bath which contains, per litre, 1 g. oleyl sulphonate, 0.75 g. formic acid and 0.07 g., of one of the brightening agents mentioned in Example 3. The bath is then heated to 60° C. within 20 minutes and kept at this temperature for 30–60 minutes. After rinsing and drying, the fabric exhibits a brilliant brightening effect.

What is claimed is:

1. 7 - [pyrazolyl-(1)]-3-[1,2,4-triazolyl-(1)]-coumarins of the formula

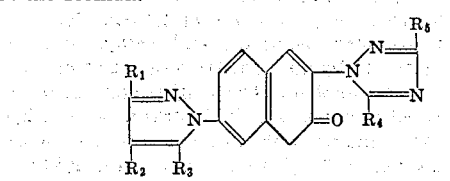

in which $R_1$ to $R_5$, independently of one another, denote H, alkyl with 1–4 carbon atoms, alkyl with 1–4 carbon atoms and a chloro or methoxy substituent, benzyl chloro benzyl, or ethoxy benzyl, phenyl, phenyl containing 1–2 substituents of the class halogen, cyano, carboxy, sulfo, sulfonamide, carbonamide, carbomethoxy, carboethoxy, methoxy or ethoxy; or halogen; or their quaternization products of the formula

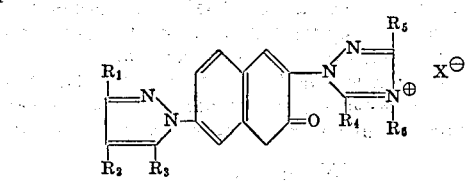

where $R_1$–$R_5$ are as defined above; $R_6$ is alkyl with 1–4 carbon atoms, or alkyl with 1–4 carbon atoms and a chloro or methoxy substituent;

benzyl 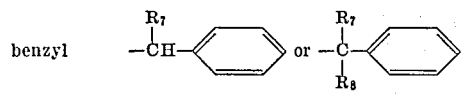

where $R_7$ and $R_8$ are lower alkyl and where the phenyl radical can contain a chloro or ethoxy substituent; and $X^{(-)}$ is a colorless anion.

2. 7 - [pyrazolyl-(1)]-3-[1,2,4-triazolyl-(1)]-coumarins of the formula

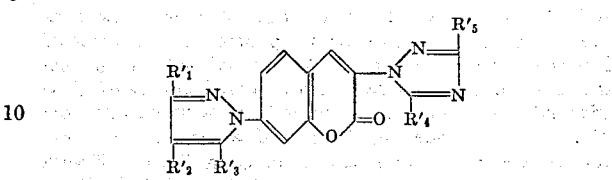

in which $R'_1$ represents hydrogen, methyl or phenyl, and $R'_2$ to $R'_5$ stand for hydrogen,
or their quaternisation products of the formula

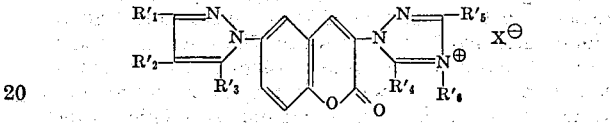

in which $R'_1$ to $R'_5$ have the same meaning as above, $R'_6$ stands for methyl or ethyl, and $X^{(-)}$ is a colorless anion.

References Cited

UNITED STATES PATENTS 3,496,188   2/1970   Wirth _____ 260—310

ALTON D. ROLLINS, Primary Examiner

U.S. Cl. X.R.

8—1 W; 106—176; 117—33.5 R; 260—141, 308 R

UNITED STATES PATENT OFFICE
CERTIFICATE OF CORRECTION

Patent No. 3,663,560    Dated May 16, 1972

Inventor(s) Carl-Wolfgang Schellhammer, Alfons Dorlars and Wolf-Dieter Wirth

It is certified that error appears in the above-identified patent and that said Letters Patent are hereby corrected as shown below:

| COLUMN | LINE | ERROR |
|---|---|---|
| 2 | 6 | "carbonmethoxyphenyl" should be --carbomethoxyphenyl--. |
| 2 | 25 | "R" should be --$R_4$--. |
| 2 | 33 | "an dacetic" should be --and acetic--. |
| 2 | 46 | "7-amino-3[1,2,4-" should be --7-amino-3-[1,2,4- --. |
| 4 | 68 | "wtihin" should be --within--. |
| 5 | Formula | (structural formula correction: $R_1$, $R_2$, $R_1$ should be $R_1$, $R_2$, $R_3$) | page 1

UNITED STATES PATENT OFFICE
CERTIFICATE OF CORRECTION

Patent No. 3,663,560          Dated May 16, 1972

Inventor(s) Carl-Wolfgang Schellhammer, Alfons Dorlars and Wolf-Dieter Wirth

It is certified that error appears in the above-identified patent and that said Letters Patent are hereby corrected as shown below:

| COLUMN | LINE | ERROR |
|---|---|---|
| 7 | Formula 1 | 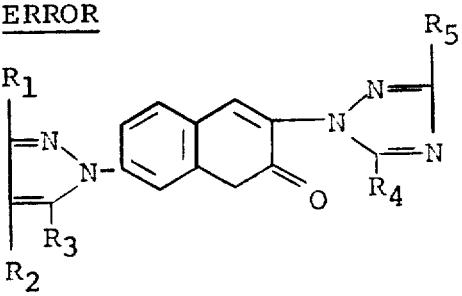 | should be

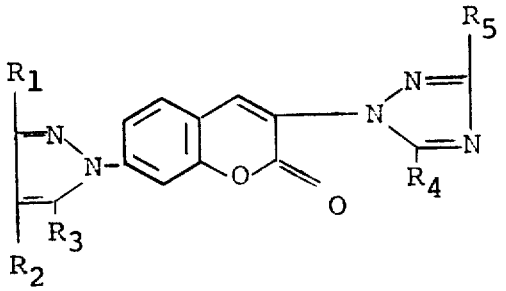

| 7 | 17 | "benzyl chloro" should be --benzyl, chloro--. | page 2

UNITED STATES PATENT OFFICE
CERTIFICATE OF CORRECTION

Patent No. 3,663,560                    Dated May 16, 1972

Inventor(s) Carl-Wolfgang Schellhammer, Alfons Dorlars and Wolf-Dieter Wirth

It is certified that error appears in the above-identified patent and that said Letters Patent are hereby corrected as shown below:

Page 3

| COLUMN | LINE | ERROR |
|---|---|---|
| 7 | Formula II | 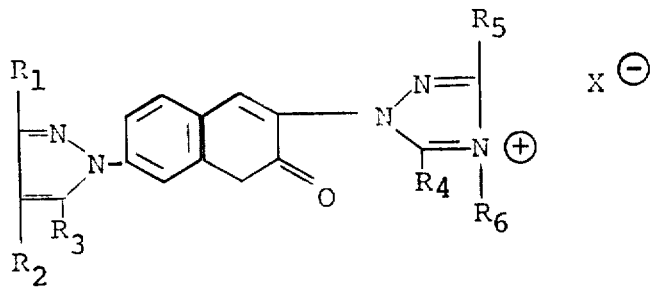 | should be

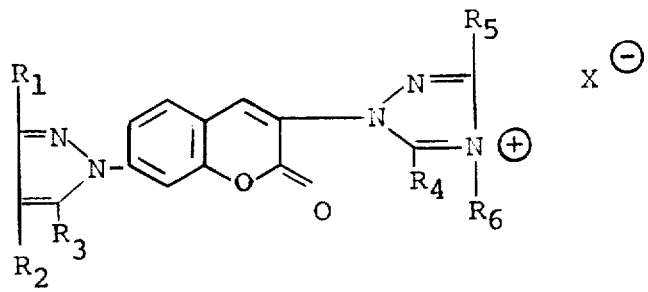

Signed and sealed this 3rd day of December 1974.

(SEAL)
Attest:

McCOY M. GIBSON JR.          C. MARSHALL DANN
Attesting Officer            Commissioner of Patents